United States Patent
Liu et al.

(10) Patent No.: US 12,222,861 B2
(45) Date of Patent: Feb. 11, 2025

(54) DATA READING METHOD AND SYSTEM AND STORAGE MEDIUM

(71) Applicant: SUZHOU METABRAIN INTELLIGENT TECHNOLOGY CO., LTD., Jiangsu (CN)

(72) Inventors: Zhikui Liu, Jiangsu (CN); Yanqing Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/692,553

(22) PCT Filed: Jun. 7, 2022

(86) PCT No.: PCT/CN2022/097428
§ 371 (c)(1),
(2) Date: Mar. 15, 2024

(87) PCT Pub. No.: WO2023/123872
PCT Pub. Date: Jul. 6, 2023

(65) Prior Publication Data
US 2024/0264943 A1 Aug. 8, 2024

(30) Foreign Application Priority Data
Dec. 27, 2021 (CN) .......................... 202111607755.4

(51) Int. Cl.
*G06F 12/0815* (2016.01)
*G06F 11/16* (2006.01)
*G06F 11/20* (2006.01)

(52) U.S. Cl.
CPC ...... *G06F 12/0815* (2013.01); *G06F 11/1658* (2013.01); *G06F 11/2056* (2013.01)

(58) Field of Classification Search
None
See application file for complete search history.

(56) References Cited

U.S. PATENT DOCUMENTS 7,028,156 B1   4/2006  Kiselev et al.
7,149,787 B1 * 12/2006  Mutalik ................ G06F 16/221
                                                            709/217
(Continued)

FOREIGN PATENT DOCUMENTS

CN          102053802 A     5/2011
CN          105573857 A     5/2016
(Continued)

*Primary Examiner* — Kaushikkumar M Patel
(74) *Attorney, Agent, or Firm* — IPro, PLLC (57) ABSTRACT

The present disclosure discloses a data reading method, which is applied to a cache mirror image pair. The cache mirror image pair includes a first node and a second node which are mirror images of each other. The method includes: when the first node receives a data reading request, determining the current state of the first node; when the current state of the first node is a mirror image recombination state, determining whether request data corresponding to the data reading request hit cache of the first node or not; if Yes, reading the request data from the cache of the first node; if No, reading the request data from cache of the second node; and feeding the request data back to a request terminal.

14 Claims, 2 Drawing Sheets

(56) References Cited

U.S. PATENT DOCUMENTS

| | | | | |
|---|---|---|---|---|
| 9,372,631 | B1* | 6/2016 | Rozendorn | G06F 3/067 |
| 2004/0236983 | A1* | 11/2004 | Burton | G06F 11/2082 |
| | | | | 714/6.23 |
| 2008/0183922 | A1* | 7/2008 | Sampathkumar | G06F 11/2082 |
| | | | | 710/59 |
| 2014/0047263 | A1* | 2/2014 | Coatney | G06F 11/2092 |
| | | | | 711/119 |
| 2021/0004160 | A1* | 1/2021 | Shasha | G06F 3/067 |
| 2021/0124658 | A1* | 4/2021 | Lan | G06F 11/2071 |
| 2021/0133059 | A1* | 5/2021 | Bono | G06F 11/2082 |
| 2023/0049823 | A1* | 2/2023 | Abouelwafa | G06F 3/0605 |

FOREIGN PATENT DOCUMENTS

| | | | |
|---|---|---|---|
| CN | 105739924 A | 7/2016 |
| CN | 105872040 A | 8/2016 |
| CN | 106325768 A | 1/2017 |
| CN | 109344011 A | 2/2019 |
| CN | 109407998 A | 3/2019 |
| CN | 112131046 A | 12/2020 |
| CN | 112256657 A | 1/2021 |
| CN | 113986148 A | 1/2022 |

\* cited by examiner

DATA READING METHOD AND SYSTEM AND STORAGE MEDIUM

CROSS-REFERENCE TO RELATED APPLICATION

The present disclosure claims the priority of Chinese patent application filed on Dec. 27, 2021 before the CNIPA, China National Intellectual Property Administration with the application number of 202111607755.4, and the title of "DATA READING METHOD AND APPARATUS AND RELATED DEVICE", which is incorporated herein in its entirety by reference.

FIELD

The present disclosure relates to the technical field of data storage and more particularly, to a data reading method, and also to a data reading apparatus, a cache mirror image system, and a computer-readable storage medium.

BACKGROUND

High-end storage fields have very high requirements for "fault-tolerant, high-performance, scalable", typically, for example, for a system with four nodes: which requires that the performance degradation shall not exceed 20% in response to any node failing; when three nodes fail, it requires the business to be uninterrupted.

For example, in a storage system, the original node 1 and node 2 form a mirror image pair to maintain a cached double copy. When the node 1 fails, the node 2 will recombine the mirror image pair with a node 3. At this time, cached data that the node 3 does not have is stored on the node 2. Therefore, after a "unique cache" on the node 2 is stored or copied to the node 3, the caches of the node 2 and the node 3 may reach an agreement.

However, the problem of the solution of caching the current recombined mirror image pair is that: it is necessary to wait for the cache of the newly added node to reach an agreement with the cache of the original node, and then the newly added node may receive the front-end request; otherwise, the front-end host can only read the old data originally stored by the new node from the new node. However, in the time window waiting for the two nodes to reach the cache agreement, the service capability of the newly added node is sacrificed in practice, so that all the front-end service pressure is on a single node, which adversely affects business performance, data security, etc.

Therefore, it is a problem to be solved urgently by a person skilled in the art of how to enable a newly added node to immediately share front-end service pressure when a cache mirror image pair are recombined, and at the same time avoid the problem of inconsistent data between the nodes during the recombination.

SUMMARY

In a first aspect, the present disclosure provides a data reading method, wherein the data reading method is applied to a cache mirror image pair, the cache mirror image pair includes a first node and a second node which are mirror images of each other, and the data reading method includes:
in response to the first node receiving a data reading request, determining a current state of the first node;
in response to the current state of the first node being a mirror image recombination state, determining whether request data corresponding to the data reading request hits a cache of the first node;
in response to the request data corresponding to the data reading request hitting the cache of the first node, reading the request data from the cache of the first node;
in response to the request data corresponding to the data reading request missing the cache of the first node, reading the request data from a cache of the second node; and
feeding the request data back to a request terminal.

In some embodiments, the data reading method further includes:
when the current state of the first node is a mirror image recombination completion state, reading the request data from the cache of the first node, and feeding the request data back to the request terminal.

In some embodiments, the data reading method further includes:
when receiving a data writing request, determining data to be written according to the data writing request;
writing the data to be written into the cache of the first node; and
sending the data to be written to the second node, so that the second node writes the data to be written to the cache of the second node.

In some embodiments, the data reading method further includes:
when the current state of the first node is the mirror image recombination state, reading unique cache data from the cache of the second node; and
writing the unique cache data into the cache thereof.

In some embodiments, the data reading method further includes:
when receiving a data deletion request, determining target deletion data according to the data deletion request;
deleting the target deletion data from the cache of the first node;
sending the data deletion request to the second node, so that the second node deletes target deletion data in the cache of the second node according to the data deletion request.

In some embodiments, reading the request data from a cache of the second node includes:
sending the data reading request to the second node via a preset communication link, so that the second node reads the request data from a cache of the second node;
receiving the request data fed back by the second node.

In a second aspect, the present disclosure discloses a data reading apparatus, wherein the data reading method is applied to a cache mirror image pair, the cache mirror image pair includes a first node and a second node which are mirror images of each other, and the data reading apparatus includes:
a current state determination module used for in response to the first node receiving a data reading request, determining the current state thereof;
a cache hit determining module used for in response to the current state of the first node being a mirror image recombination state, determining whether request data corresponding to the data reading request hits a cache of the first node;
a first data reading module used for in response to the request data hitting the cache of the first node, reading the request data from the cache of the first node;

a second data reading module used for in response to the request data missing the cache of the first node, reading the request data from the cache of the second node; and a request data feeding back module used for feeding the request data back to a request terminal.

In some embodiments, the second data reading module is used for sending the data reading request to the second node via a preset communication link, so that the second node reads the request data from the cache of the second node; receiving the request data fed back by the second node.

In a third aspect, the present disclosure further discloses a cache mirror image system, wherein the cache mirror image system includes a first node and a second node which are mirror images of each other, and the first node includes:

a memory used for storing computer-readable instructions; and a processor used for implementing operations of the data reading method described above when executing the computer-readable instructions.

In a fourth aspect, the present disclosure also discloses a computer-readable storage medium, e.g. a non-transitory computer-readable storage medium, storing computer-readable instructions, the computer program, when executed by a processor, implements operations of any of the data reading methods as described above.

BRIEF DESCRIPTION OF THE DRAWINGS

In order to more clearly illustrate the state of the art and the embodiments of the present disclosure, a brief description will be given below of the drawings that need to be used in the description of the state of the art and the embodiments of the present disclosure. Certainly, the following description of the drawings relating to the embodiments of the present disclosure is merely a part of the embodiments of the present disclosure, and a person skilled in the art would have been able to obtain other drawings according to the provided drawings without involving any inventive effort, and the obtained other drawings also fall within the scope of protection of the present disclosure.

DETAILED DESCRIPTION

In order to more clearly and completely describe the technical solutions in the embodiments of the present disclosure, the technical solutions in the embodiments of the present disclosure will be described below with reference to the drawings in the embodiments of the present disclosure. It is to be understood that the described embodiments are only a partial embodiment of the present disclosure and not all embodiments. Based on the embodiments in the present disclosure, all the other embodiments obtained by a person skilled in the art without involving any inventive effort fall within the scope of protection of the present disclosure.

One or more embodiments of the present disclosure provide a data reading method.

Figure 1:
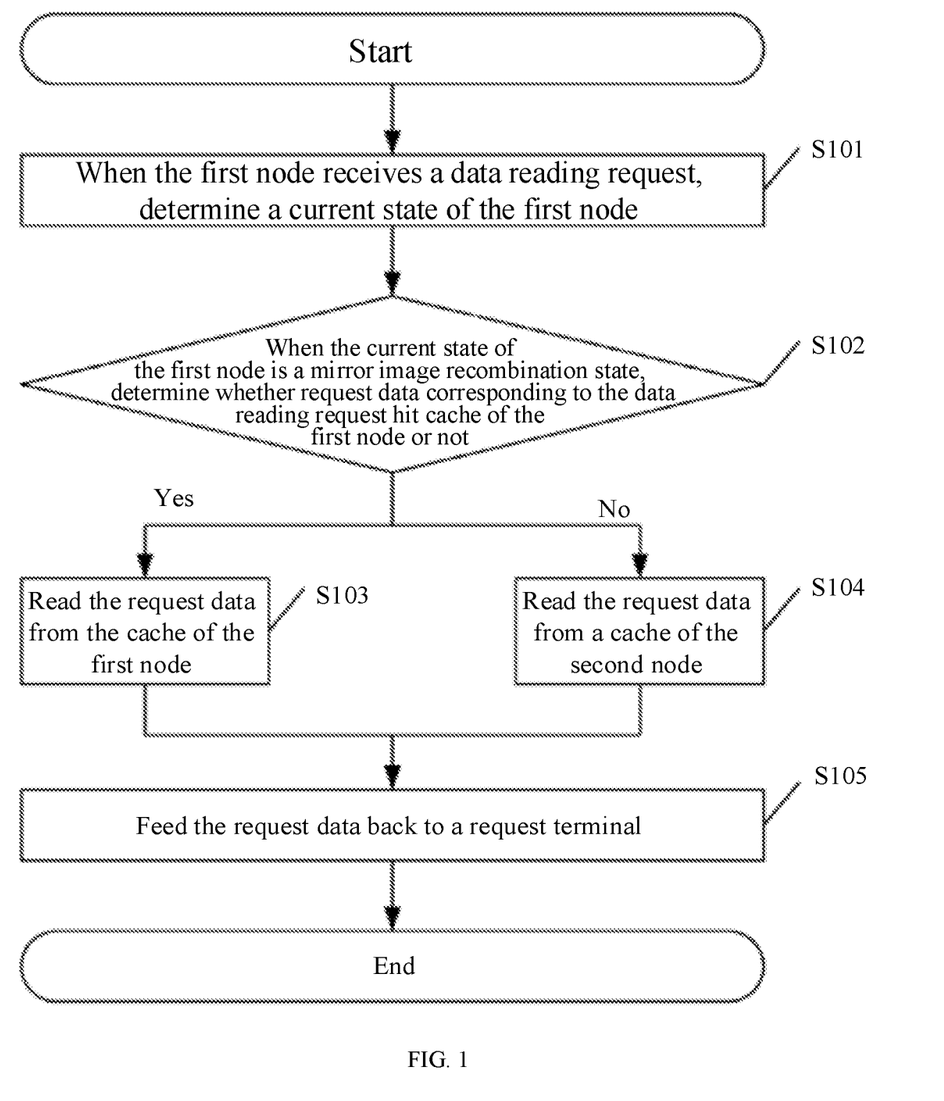
FIG. 1 is a schematic flow chart of a data reading method according to the present disclosure.

With reference to FIG. 1, FIG. 1 is a schematic flow chart of a data reading method provided in the present disclosure, and the data reading method is applied to a cache mirror image pair, wherein the cache mirror image pair includes a first node and a second node which are mirror images of each other, and the data reading method may include:

S101: when the first node receives a data reading request, determining a current state of the first node.

The data reading method provided in the present disclosure is applied to the cache mirror image pair, the cache mirror image pair includes the first node and the second node, and the first node and the second node are mirror image nodes with each other, and therefore the first node and the second node should store the same data information. However, when in a mirror image pair recombination state, it needs to perform cache synchronization between the two. Therefore, when the first node receives the data reading request, the current state of the first node may be firstly determined, so as to determine whether it is currently in a mirror image pair recombination state or a mirror image pair recombination completion state, and thus the received read data request may be processed according to the current state of the first node.

It can be understood that mirror image pair recombination is that when any one node in the original cache mirror image pair fails, a new node is added to constitute a new cache mirror image pair with the node which has not failed. For the convenience of introduction, the first node mentioned above refers to the newly added node, and the second node is the node which has not failed in the original cache mirror pair.

The data reading request is a request for acquiring data information sent by a front end (namely, a request terminal described below), and may be initiated by a user according to actual needs. In some embodiments, when the first node receives the data reading request, it may first determine the state which the first node is in, namely, determine whether it is currently in a mirror image pair recombination state or a state in which mirror image pair recombination is completed, and then perform subsequent processing on the data reading request according to the current state of the first node.

S102: when the current state of the first node is a mirror image recombination state, determining whether request data corresponding to the data reading request hits a cache of the first node; if Yes, executing S103; if No, executing S104;

S103: reading request data from the cache of the first node;

S104: reading the request data from a cache of the second node.

When the current state of the first node is the mirror image recombination state, namely, a mirror image pair recombination state, the acquisition of the request data may be realized by accessing two nodes. In some embodiments, when the request data (namely, the reading data) corresponding to the data reading request hits the cache of the first node, namely, the request data is stored in the cache of the first node, the request data may be directly read from the cache of the first node. When the request data misses the cache of the first node, i.e., no request data is stored in the cache of the first node, the request data may be acquired from the cache of the second node.

It can be understood that although it is currently only in the mirror image pair recombination state, the two nodes do not complete data synchronization. However, for the front end, the first node and the second node are already a cache mirror image pair. Therefore, when the front end sends the data reading request to the first node, the data information in the second node is stored in the first node by default, and based on this, even if the request data misses the cache of the first node, the first node may still acquire the request data from the cache of the second node. Thus, even if the two nodes are in the mirror image pair recombination state, the newly added first node may still serve the front end, and the process of the first node acquiring request data from the second node is unaware for the front end.

S104: feeding the request data back to a request terminal.

This step is intended to realize feeding back of the request data. As previously stated, the data reading request refers to a request for reading data information initiated by the front end, namely, the request terminal. And therefore, after obtaining corresponding request data, the request data may be fed back to the request terminal. Further, it may be presented via a front-end visualization interface to facilitate a more intuitive view of the request data by the user.

It can be seen that, in the data reading method provided in the present disclosure, with regard to two nodes in a recombination cache mirror image pair state, when a new node (namely, the first node) receives the data reading request, it may acquire the request data by means of accessing the two nodes, namely, when the request data hits the cache of the first node, reading data from the cache of the first node, and when the request data misses the cache of the first node, acquiring data from the cache of the second node. Therefore, in the process of the recombination of the cache mirror image pair, the new node does not need to wait for the caches of the two nodes to reach an agreement before providing a service for the front end; instead, the front end may be served immediately during the recombination process of the cache mirror image pair, which avoids the sacrifice of the service capability of the new node in the time window waiting for the caches of the two nodes to reach an agreement, therefore, the performance and data security of the front end during the recombination process of the cache mirror image pair may be greatly optimized.

In one or more embodiments of the present disclosure, the data reading method may further include: when the current state of the first node is a mirror image recombination completion state, reading the request data from the cache of the first node, and feeding the request data back to the request terminal.

As previously stated, when the current state of the first node is the mirror image recombination state, the method of accessing two nodes may be used to realize the acquisition of request data. Then, when the current state of the first node is the mirror recombination completion state, it indicates that data synchronization has been completed between the first node and the second node, that is to say, the data stored in the first node cache is identical to the data stored in the second node cache. On this basis, with regard to the received data reading request, the first node may directly read and obtain the request data from the cache of the first node, i.e., it only needs to access the cache of the first node, and does not need to access two node caches, which is faster and more efficient. Further, after reading the obtained request data, it may be fed back to the request terminal.

In one or more embodiments of the present disclosure, the data reading method may further include: when receiving a data writing request, determining data to be written according to the data writing request; writing the data to be written into the cache of the first node; sending the data to be written to the second node, so that the second node writes the data to be written to the cache of the second node.

It should be understood that, the system nodes may provide data write services in addition to data read services for the front end. In some embodiments, a request terminal may attach data to be written to the data writing request, and send the data writing request to the first node; when the first node receives the data writing request, the data to be written may be determined according to the data writing request first, and then the data to be written is written into the cache of the first node. At the same time, since the first node and the second node are mirror image nodes with each other, the two need data synchronization. Therefore, the first node may also send the data to be written to the second node, and the second node writes the data to be written into the cache of the second node, so as to ensure that the stored data in the first node cache is consistent with that in the second node cache.

In one or more embodiments of the present disclosure, the data reading method may further include: when the current state of the first node is the mirror image recombination state, reading unique cache data from the cache of the second node; writing the unique cache data into the cache of the first node.

As stated above, in the process of mirror recombination, data synchronization between two nodes needs to be performed, so as to ensure the consistency of the stored data of the two nodes. Therefore, when the current state of the first node is the mirror image recombination state, unique cache data may be acquired from the cache of the second node, the unique cache data refers to data information which is not stored in the cache of the first node but stored in the cache of the second node. Furthermore, after the unique cache data therein is read from the cache of the second node and is acquired, it can be stored in the cache thereof, namely, the cache of the first node. Thereby, realizing data synchronization between the first node and the second node, and realizing the conversion from the mirror image recombination state into the mirror image recombination completion state.

In one or more embodiments of the present disclosure, the data reading method may further include: when receiving the data deletion request, determining target deletion data according to the data deletion request; deleting the target deletion data from the cache of the first node; sending the data deletion request to the second node, so that the second node deletes target deletion data in the cache of the second node according to the data deletion request.

Further, the system node may provide a data deletion service, i.e. deleting specified data in the cache, in addition to providing a data read service and a data write service for the front end. In some embodiments, the request terminal may attach data information about the target deletion data to the data deletion request, and send the data deletion request to the first node, the data information about the target deletion data may be storage location information, identifier information, etc. of the target deletion data in the cache. Further, when the first node receives the data deletion request, then the target deletion data may be deleted from the cache of the first node according to the data deletion request. At the same time, since the first node and the second node are mirror image nodes with each other, the stored data information of the two is completely consistent, the first node may also send the data to be deleted to the second node, and the second node deletes the target deletion data in the cache of the second node, so as to ensure that the stored data in the first node cache is consistent with that in the second node cache.

In one or more embodiments of the present disclosure, reading request data from the cache of the second node may include: sending the data reading request to the second node via a preset communication link, so that the second node reads the request data from the cache of the second node; receiving the request data fed back by the second node.

In an embodiment of the present disclosure, a method for realizing data synchronization between the first node and the second node is provided, and in some embodiments, a communication chain (namely, the above-mentioned preset communication chain) may be established between the first node and the second node, and the communication chain may comply with a corresponding data protocol, and thus data synchronization between two nodes may be realized based on the communication chain. On this basis, when it is necessary to read the request data from the cache of the second node, the first node may send the data reading request to the second node via a preset communication chain, and the second node reads and obtains the request data from the cache of the second node and feeds same back to the first node.

On the basis of the above-mentioned embodiments, reference may be made to a data read/write method flow in the following examples:

assumptions: node 1 is the second node, namely, the node that has not failed in the original cache mirror image pair; node 2 is the first node, i.e. the node that needs to be re-mirrored with node 1. Among them, unique cache data A, B, and C are stored on the node 1, and the same data C and D are stored on the node 1 and the node 2.

In the process of the recombination of a mirror image pair between the node 1 and the node 2, the node 2 may provide read and write services to the front end immediately. On this basis:

when the node 1 receives the data writing request, writes the data to be written into the cache of the node 1 according to the data writing request, and at the same time sends the data writing request to node 2, so that node 2 writes the data to be written into the cache of the node 2 according to the data writing request;

when the node 2 receives the data writing request, writing the data to be written into the cache of the node 2 according to the data writing request, and at the same time sends the data writing request to the node 1, so that the node 1 writes the data to be written into the cache of the node 1 according to the data writing request;

when receiving the data reading request, the node 1 determines the request data according to the data reading request, reads the request data from the cache of the node 1, and feeds same back to the front end;

when receiving the data reading request, the node 2 will determine whether the request data hits the cache of the node 2 according to the data reading request, and when it hits the cache of the node 2, the request data will be directly read from the cache of the node 2 and fed back to the front end; and when it misses the cache of the node 2, sending a data reading request to the node 1, so that the node 1 reads the request data from the cache of the node 1 and feeds same back to the node 2, and the node 2 then feeds the request data back to the front end.

After the node 1 and the node 2 complete mirror image pair recombination, the difference from the above-mentioned business process is as follows:

when the node 2 receives the data reading request, it reads the request data from the cache of the node 2 directly according to the data reading request and feeds the request data back to the front end.

In the data reading method provided by one or more embodiments of the present disclosure, with regard to two nodes in the recombination cache mirror image pair state, when a new node (namely, the first node) receives the data reading request, it may acquire request data by means of accessing the two nodes, namely, when the request data hits the cache of the first node, reading data from the cache of the first node, and when the request data misses the cache of the first node, acquiring data from the cache of the second node. Therefore, in the process of the recombination of the cache mirror image pair, the new node does not need to wait for the caches of the two nodes to reach an agreement before providing a service for a front end; instead, the front end may be served immediately during the process of the recombination of the cache mirror image pair, which avoids the sacrifice of the service capability of the new node in the time window waiting for the caches of the two nodes to reach an agreement, therefore, the performance and data security of the front end during the process of the recombination of a cache mirror image pair may be greatly optimized.

Figure 2:
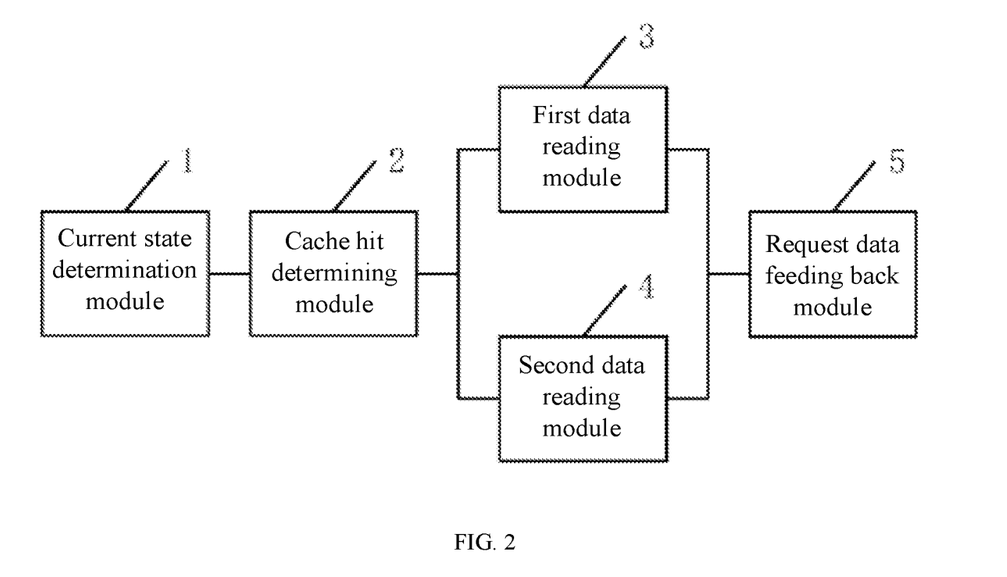
FIG. 2 is a schematic structural diagram of a data reading apparatus according to the present disclosure.

One or more embodiments of the present disclosure also provide a data reading apparatus, please refer to FIG. 2, and FIG. 2 is a schematic structural diagram of a data reading apparatus provided in the present disclosure, wherein the data reading apparatus is applied to a cache mirror image pair, and the cache mirror image pair includes a first node and a second node which are mirror images of each other, and the data reading apparatus may include:

a current state determination module 1 used for, when the first node receives a data reading request, determining the current state of the first node;

a cache hit determining module 2 used for, when the current state of the first node is a mirror image recombination state, determining whether request data corresponding to the data reading request hits the cache of the first node;

a first data reading module 3 used for, when the request data hits the cache of the first node, reading the request data from the cache of the first node;

a second data reading module 4 used for, when the request data misses the cache of the first node, reading the request data from the cache of the second node; and a request data feeding back module 5 used for feeding the request data back to a request terminal.

In one or more embodiments of the present disclosure, the data reading apparatus may further include a third data reading module, used for when the current state of the first node is a mirror image recombination completion state, reading the request data from the cache of the first node, and feeding the request data back to the request terminal.

In one or more embodiments of the present disclosure, the data reading apparatus may further include a data writing module, used for when receiving a data writing request, determining data to be written according to the data writing request; writing the data to be written into the cache of the first node; and sending the data to be written to the second node so that the second node writes the data to be written to the cache of the second node.

In one or more embodiments of the present disclosure, the data reading apparatus may further include a cache synchronization module, used for when the current state of the first node is the mirror image recombination state, reading unique cache data from a cache of the second node; writing the unique cache data into the cache of the first node.

In one or more embodiments of the present disclosure, the data reading apparatus may further include a data deletion module used for, when receiving a data deletion request, determining target deletion data according to the data deletion request; deleting the target deletion data from the cache of the first node; and sending the data deletion request to the second node, so that the second node deletes target deletion data in the cache of the second node according to the data deletion request.

In one or more embodiments of the present disclosure, the second data reading module 4 is used for sending the data reading request to the second node via a preset communication link, so that the second node reads the request data from the cache of the second node; and receiving the request data fed back by the second node.

For a description of the apparatus provided in the present disclosure, reference is made to the above-mentioned method embodiments, and the present disclosure will not be repeated here.

Figure 3:
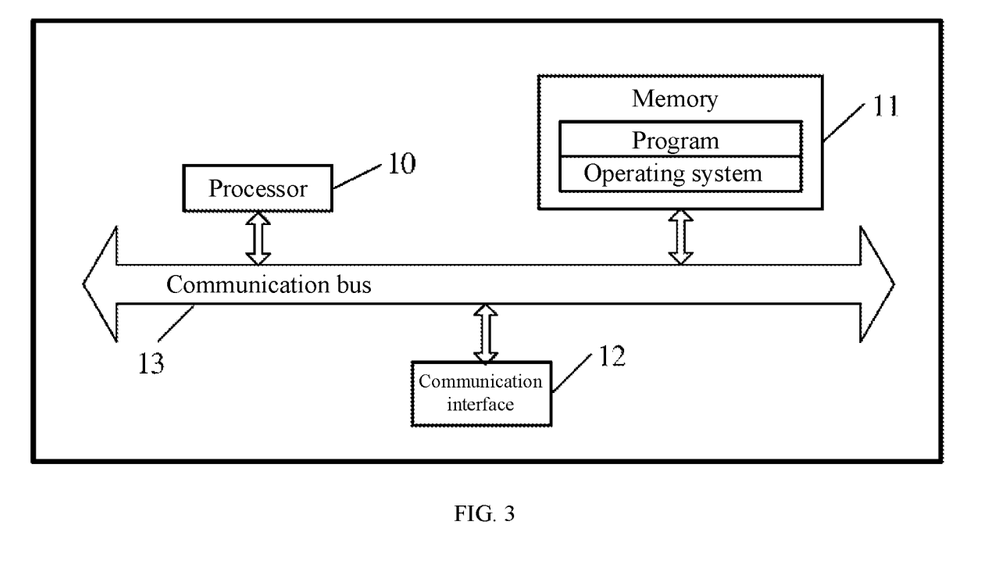
FIG. 3 is a schematic structural diagram of a computer device according to the present disclosure.

The present disclosure also provides a cache mirror image system, wherein the cache mirror image system includes a first node and a second node which are mirror images of each other, please refer to FIG. 3, and FIG. 3 is a schematic structural diagram of a computer device provided in the present disclosure, wherein the computer device may be a first node or a second node and may include:
- a memory used for storing a computer program; and
- a processor used for realizing the operations of the data reading method described above when executing the computer program.

As shown in FIG. 3, which shows a schematic diagram of the composition structure of a computer device, and the computer device may include a processor 10, a memory 11, a communication interface 12, and a communication bus 13. The processor 10, the memory 11, and the communication interface 12 all communicate with each other via a communication bus 13.

In an embodiment of the present disclosure, the processor 10 may be a Central Processing Unit (CPU) application-specific integrated circuit, a digital signal processor, a field programmable gate array or other programmable logic device, or the like.

The processor 10 may call programs stored in the memory 11, and in some embodiments, the processor 10 may execute operations in embodiments of the data reading method.

The memory 11 is used for storing one or more programs, and the programs may include program codes, wherein the program codes include computer operation instructions. In an embodiment of the present disclosure, the memory 11 stores at least a program for realizing the following functions:
- when the first node receives a data reading request, determining the current state of the first node;
- when the current state of the first node is a mirror image recombination state, determining whether request data corresponding to the data reading request hits a cache of the first node;
- if yes, reading the request data from the cache of the first node;
- if no, reading the request data from the cache of the second node; and
- feeding the request data back to a request terminal.

In one possible implementation, the memory 11 may include a stored program area and a stored data area, wherein the stored program area may store an operating system, an application program required for at least one function, etc.; the storage data area may store data created during use.

In addition, the memory 11 may include high-speed random access memory and may also include non-transitory memory, such as at least one magnetic disk storage device or other volatile solid state storage device.

The communication interface 12 may be an interface to a communication module for interfacing with other devices or systems.

Certainly, it should be noted that the structure shown in FIG. 3 does not constitute a limitation of the computer device in the embodiments of the present disclosure, and in practical applications, the computer device may include more or fewer components than those shown in FIG. 3, or some components may be combined.

The present disclosure also provides a computer-readable storage medium having stored thereon a computer program which when executed by a processor implements the operations of any of the data reading methods described above.

The computer-readable storage medium may include various medium that may store the program code, such as U-disk, removable hard disk, Read-Only Memory (ROM), random Access Memory (RAM), magnetic or optical disk.

For a description of the computer-readable storage medium provided in the present disclosure, reference is made to the above-mentioned method embodiments, and the description thereof will not be repeated here.

Various embodiments are described in the specification in a progressive manner, with each embodiment focusing on differences from the other embodiments, and with reference to the same or similar parts of the various embodiments. The apparatus disclosed in the embodiments is relatively simple to describe since it corresponds to the method disclosed in the embodiments, as explained in the method section.

Those of skill would further appreciate that the elements and algorithm steps described in connection with the embodiments disclosed herein may be implemented as electronic hardware, computer software, or combinations of both. To clearly illustrate this interchangeability of hardware and software, various illustrative components and steps have been described above generally in terms of their functionality. Whether such functionality is implemented as hardware or software depends upon the particular application and design constraints imposed on the implementation. Skilled artisans may implement the described functionality in varying methods for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM, memory, ROM, electrically programmable ROM, electrically erasable programmable ROM, registers, hard disk, a removable disk, a CD-ROM, or any other form of storage medium known in the art.

The technical solutions provided in the present disclosure are described in detail above. The principles and embodiments of the present disclosure have been described herein using specific examples, which are intended only to aid in the understanding of the methods and their core concepts of the present disclosure. It should be noted that a person skilled in the art may make several improvements and modifications to this application without departing from the principles of this application, and these improvements and modifications also fall within the scope of protection of the present disclosure.

The invention claimed is:

1. A data reading method, wherein the data reading method is applied to a cache mirror image pair, the cache mirror image pair comprises a first node and a second node which are mirror images of each other, the first node is a newly added node, and the second node is a node which has not failed in an original cache mirror pair, when any one node in the original cache mirror image pair fails, the first node is added to constitute the cache mirror image pair with the second node, and the data reading method comprises:

in response to the first node receiving a data reading request, determining a current state of the first node;

in response to the current state of the first node being a mirror image recombination state, and the request data corresponding to the data reading request hitting the cache of the first node, reading the request data from the cache of the first node;

in response to the current state of the first node being the mirror image recombination state, and the request data corresponding to the data reading request missing the cache of the first node, reading the request data from a cache of the second node; and feeding the request data back to a request terminal;

wherein the data reading method further comprises:

in response to the current state of the first node being a mirror image recombination completion state, reading the request data from the cache of the first node, and feeding the request data back to the request terminal;

wherein the data reading method further comprises:

in response to the current state of the first node being the mirror image recombination state, reading unique cache data from the cache of the second node; and writing the unique cache data into the cache of the first node.

2. The data reading method according to claim 1, further comprising:

in response to receiving a data writing request, determining data to be written according to the data writing request;

writing the data to be written into the cache of the first node; and sending the data to be written to the second node, so that the second node writes the data to be written to the cache of the second node.

3. The data reading method according to claim 1, further comprising:

in response to receiving a data deletion request, determining target deletion data according to the data deletion request;

deleting the target deletion data from the cache of the first node; and sending the data deletion request to the second node, so that the second node deletes the target deletion data in the cache of the second node according to the data deletion request.

4. The data reading method according to claim 1, wherein reading the request data from a cache of the second node comprises:

sending the data reading request to the second node via a preset communication link, so that the second node reads the request data from the cache of the second node; and receiving the request data fed back by the second node.

5. The data reading method according to claim 1, further comprising:

in response to the second node receiving a data writing request, determining data to be written according to the data writing request;

writing the data to be written into the cache of the second node; and sending the data to be written to the first node, so that the first node writes the data to be written to the cache of the first node.

6. The data reading method according to claim 1, further comprising:

in response to the second node receiving the data reading request, determining the request data according to the data reading request, reading the request data from the cache of the second node; and feeding the request data back to the request terminal.

7. A cache mirror image system, wherein the cache mirror image system comprises a first node and a second node which are mirror images of each other, the first node is a newly added node, and the second node is a node which has not failed in an original cache mirror pair, when any one node in the original cache mirror image pair fails, the first node is added to constitute a cache mirror image pair with the second node, and the first node comprises:

a memory used for storing computer-readable instructions;

a processor used for implementing operations comprising:

in response to the first node receiving a data reading request, determining a current state of the first node;

in response to the current state of the first node being a mirror image recombination state, and the request data corresponding to the data reading request hitting the cache of the first node, reading the request data from the cache of the first node;

in response to the current state of the first node being the mirror image recombination state, and the request data corresponding to the data reading request missing the cache of the first node, reading the request data from a cache of the second node; and feeding the request data back to a request terminal;

wherein the operations further comprise:

in response to the current state of the first node being a mirror image recombination completion state, reading the request data from the cache of the first node, and feeding the request data back to the request terminal;

wherein the data reading method further comprises:

in response to the current state of the first node being the mirror image recombination state, reading unique cache data from the cache of the second node; and writing the unique cache data into the cache of the first node.

8. The cache mirror image system according to claim 7, wherein the operations further comprise:

in response to the first node receiving a data writing request, determining data to be written according to the data writing request;

writing the data to be written into the cache of the first node; and sending the data to be written to the second node, so that the second node writes the data to be written to the cache of the second node.

9. The cache mirror image system according to claim 7, wherein the operations further comprise:

in response to the first node receiving a data deletion request, determining target deletion data according to the data deletion request;

deleting the target deletion data from the cache of the first node; and sending the data deletion request to the second node, so that the second node deletes the target deletion data in the cache of the second node according to the data deletion request.

10. The cache mirror image system according to claim 7, wherein the operation of reading the request data from a cache of the second node comprises:

sending the data reading request to the second node via a preset communication link, so that the second node reads the request data from the cache of the second node; and receiving the request data fed back by the second node.

11. A non-transitory computer-readable storage medium, wherein the computer-readable storage medium stores computer-readable instructions applied to a cache mirror image pair, the cache mirror image pair comprises a first node and a second node which are mirror images of each other, the first node is a newly added node, and the second node is a node which has not failed in an original cache mirror pair, when any one node in the original cache mirror image pair fails, the first node is added to constitute the cache mirror image pair with the second node, and the computer-readable instructions, when executed by a processor, implement operations comprising:

in response to the first node receiving a data reading request, determining a current state of the first node;

in response to the current state of the first node being a mirror image recombination state, and the request data corresponding to the data reading request hitting the cache of the first node, reading the request data from the cache of the first node;

in response to the current state of the first node being the mirror image recombination state, and the request data corresponding to the data reading request missing the cache of the first node, reading the request data from a cache of the second node; and feeding the request data back to a request terminal;

wherein the operations further comprise:

in response to the current state of the first node being a mirror image recombination completion state, reading the request data from the cache of the first node, and feeding the request data back to the request terminal;

wherein the data reading method further comprises:

in response to the current state of the first node being the mirror image recombination state, reading unique cache data from the cache of the second node; and writing the unique cache data into the cache of the first node.

12. The non-transitory computer-readable storage medium according to claim 10, wherein the operations further comprise:

in response to the first node receiving a data writing request, determining data to be written according to the data writing request;

writing the data to be written into the cache of the first node; and sending the data to be written to the second node, so that the second node writes the data to be written to the cache of the second node.

13. The non-transitory computer-readable storage medium according to claim 10, wherein the operations further comprise:

in response to the first node receiving a data deletion request, determining target deletion data according to the data deletion request;

deleting the target deletion data from the cache of the first node; and sending the data deletion request to the second node, so that the second node deletes the target deletion data in the cache of the second node according to the data deletion request.

14. The non-transitory computer-readable storage medium according to claim 11, wherein the operation of reading the request data from a cache of the second node comprises:

sending the data reading request to the second node via a preset communication link, so that the second node reads the request data from the cache of the second node; and receiving the request data fed back by the second node.

* * * * *